US007870418B2

(12) United States Patent
Sekaran et al.

(10) Patent No.: US 7,870,418 B2
(45) Date of Patent: Jan. 11, 2011

(54) ENHANCED PRESENCE ROUTING AND ROSTER FIDELITY BY PROACTIVE CRASHED ENDPOINT DETECTION

(75) Inventors: Dhigha D. Sekaran, Redmond, WA (US); Sankaran Narayanan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 12/038,300

(22) Filed: Feb. 27, 2008

(65) Prior Publication Data
US 2009/0217109 A1    Aug. 27, 2009

(51) Int. Cl.
G06F 11/00 (2006.01)
(52) U.S. Cl. .......................................... 714/4; 709/206
(58) Field of Classification Search ............... 714/4
See application file for complete search history.

(56) References Cited

U.S. PATENT DOCUMENTS

| | | | |
|---|---|---|---|
| 5,146,452 A | 9/1992 | Pekarske | 370/16 |
| 5,435,003 A | 7/1995 | Chng et al. | 395/575 |
| 5,694,542 A | 12/1997 | Kopetz | 395/182.02 |
| 5,784,547 A | 7/1998 | Dittmar et al. | 395/182.02 |
| 5,983,226 A | 11/1999 | Commerford et al. | 707/8 |
| 6,871,214 B2* | 3/2005 | Parsons et al. | 709/206 |
| 6,976,071 B1 | 12/2005 | Donzis et al. | 709/224 |
| 7,031,437 B1* | 4/2006 | Parsons et al. | 379/88.12 |
| 7,127,526 B1* | 10/2006 | Duncan et al. | 709/249 |
| 7,231,021 B2* | 6/2007 | Bettis et al. | 379/88.17 |
| 7,394,345 B1* | 7/2008 | Ehlinger et al. | 340/5.21 |
| 7,564,955 B2* | 7/2009 | Bettis et al. | 379/88.17 |
| 7,684,321 B2* | 3/2010 | Muirhead et al. | 370/230 |
| 7,697,924 B2* | 4/2010 | Caspi et al. | 455/415 |
| 7,701,929 B2* | 4/2010 | Bettis et al. | 370/354 |
| 7,706,401 B2* | 4/2010 | Bae et al. | 370/466 |
| 2002/0085701 A1* | 7/2002 | Parsons et al. | 379/211.01 |
| 2002/0131561 A1* | 9/2002 | Gifford et al. | 379/67.1 |
| 2004/0122976 A1 | 6/2004 | Dutta et al. | 709/245 |
| 2004/0141594 A1* | 7/2004 | Brunson et al. | 379/88.12 |

(Continued)

OTHER PUBLICATIONS

Fast Low-Cost Failure Recovery for Reliable Real-Time Multimedia Communication http://kabru.eecs.umich.edu/papers/publications/1998/sjhan-network98.ps.gz.

(Continued)

*Primary Examiner*—Scott T Baderman
*Assistant Examiner*—Kamini Patel
(74) *Attorney, Agent, or Firm*—Merchant & Gould P.C.

(57) ABSTRACT

Endpoint crashes in a real time communication system are detected by a home server providing presence and other services to the endpoint upon receipt of an error message from an access server between the endpoint and the home server. The home server uses a cookie inserted into a dialog between itself and the endpoint identifying the endpoint, a session state created by the access server identifying the endpoint, or a transaction state maintained by the home server to look up the endpoint associated with the error message. Race conditions occurring when an endpoint crashes and recovers rapidly can be avoided employing a timestamp or sequence number incremented for each new endpoint registration and comparing a current timestamp or sequence number to the stored one before updating records at the home server. By notifying other subscribers about crashed endpoints, routing fidelity is enhanced.

18 Claims, 7 Drawing Sheets

U.S. PATENT DOCUMENTS

| | | | |
|---|---|---|---|
| 2005/0068167 A1* | 3/2005 | Boyer et al. | 340/531 |
| 2005/0207399 A1 | 9/2005 | Spitzer | 370/352 |
| 2006/0121916 A1* | 6/2006 | Aborn et al. | 455/456.5 |
| 2006/0218630 A1* | 9/2006 | Pearson et al. | 726/8 |
| 2006/0277596 A1* | 12/2006 | Calvert et al. | 726/3 |
| 2007/0036143 A1* | 2/2007 | Alt et al. | 370/352 |
| 2007/0067439 A1* | 3/2007 | Mason et al. | 709/224 |
| 2007/0097994 A1* | 5/2007 | Samdadiya et al. | 370/401 |
| 2008/0025223 A1* | 1/2008 | Karacali-Akyamac et al. | 370/241 |
| 2008/0043969 A1* | 2/2008 | Shi | 379/211.02 |
| 2008/0059587 A1* | 3/2008 | Burtner et al. | 709/206 |
| 2008/0155031 A1* | 6/2008 | Fortier et al. | 709/206 |
| 2008/0244418 A1* | 10/2008 | Manolescu et al. | 715/753 |
| 2008/0260169 A1* | 10/2008 | Reuss | 381/58 |
| 2008/0285734 A1* | 11/2008 | Ehlinger et al. | 379/201.07 |
| 2008/0294408 A1* | 11/2008 | Padmanabhan | 703/13 |
| 2008/0299948 A1* | 12/2008 | Rosener | 455/412.2 |
| 2009/0003542 A1* | 1/2009 | Ramanathan et al. | 379/88.13 |
| 2009/0009343 A1* | 1/2009 | Boyer et al. | 340/573.1 |
| 2009/0034696 A1* | 2/2009 | Ramanathan | 379/88.17 |
| 2009/0107265 A1* | 4/2009 | Parker et al. | 73/866.1 |
| 2009/0112996 A1* | 4/2009 | Baker et al. | 709/206 |
| 2009/0112997 A1* | 4/2009 | Parker et al. | 709/206 |
| 2009/0180602 A1* | 7/2009 | Ramanathan et al. | 379/211.02 |
| 2009/0181648 A1* | 7/2009 | Bao et al. | 455/414.1 |
| 2009/0181702 A1* | 7/2009 | Vargas et al. | 455/466 |
| 2009/0300170 A1* | 12/2009 | Bhame et al. | 709/224 |

OTHER PUBLICATIONS

Armada Middleware and Communication Services http://www.arbornetworks.com/index.php?option=com_docman&task=doc_download&gid=89.

On the Design of a Failure Detection Service for Large-Scale Distributed Systems http://ddg.jaist.ac.jp/pub/DHK03.pdf.

* cited by examiner

ENHANCED PRESENCE ROUTING AND ROSTER FIDELITY BY PROACTIVE CRASHED ENDPOINT DETECTION

BACKGROUND

As an alternative to Public Switched Telephone Network (PSTN) systems, cellular phone networks have proliferated over the last decade where users with cellular phones have access to one or more networks at almost any location. Also a recent development is the wide spread use of Voice over IP (VOIP) telephony, which uses internet protocol over wired and wireless networks. With the availability of such diverse types of communication networks and devices capable of taking advantage of various features of these networks, a new technology is bringing different communication networks together providing until now unavailable functionality such as combining various modes of communication (e.g. instant messaging, voice calls, video communications, etc.). This technology is referred to as unified communications (UC). A network of servers manages end devices capable of handling a wide range of functionality and communication while facilitating communications between the more modern unified communication network devices and other networks (e.g. PSTN, cellular, etc.).

In addition to accommodating various modes of communication, modern real time communication systems such as UC systems can facilitate presence and routing capabilities, which basically enable a user to place and receive calls (in any communication form) through a number of end devices regardless of physical location. For example, a user may define a destination number (identifier), where he/she can be reached at different times or depending on the context of the call, and the system is capable of routing the call based on the user provided rules. To accommodate such complex functionalities, modern systems typically include a large number of client devices, servers, and other specialized devices (endpoints) and software.

In order to provide satisfactory user experience, a real time communication system needs to offer accurate presence and routing fidelity. Presence fidelity means the presence state of an endpoint is reported very accurately to the user's subscribers who have subscribed for the user's presence. This applies to both users subscribing to other users and the roster information communicated in a conferencing system. The ability of the system to accurately pick and route to a valid, available endpoint is called as routing fidelity. To a large extent, routing fidelity is influenced by presence fidelity—bad presence fidelity reduces routing fidelity and consequently the number of failed call attempts due to stale endpoints becomes high.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a real time communication and conferencing system that provides presence and call routing services utilizing the same protocol and a proactive endpoint crash detection mechanism. The crash detection mechanism may include use of a session state to detect and alert about crashes, use of a cookie with endpoint information, and/or use of a transaction state for each outgoing request. According to some embodiments, a timestamp may be used to prevent race conditions in endpoint invalidation.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, presence and call routing services may be provided in a real time communication system utilizing a proactive endpoint crash detection mechanism such as use of a session state to detect and alert about crashes, use of a cookie with endpoint information, use of a transaction state for each outgoing request, and/or a timestamp. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
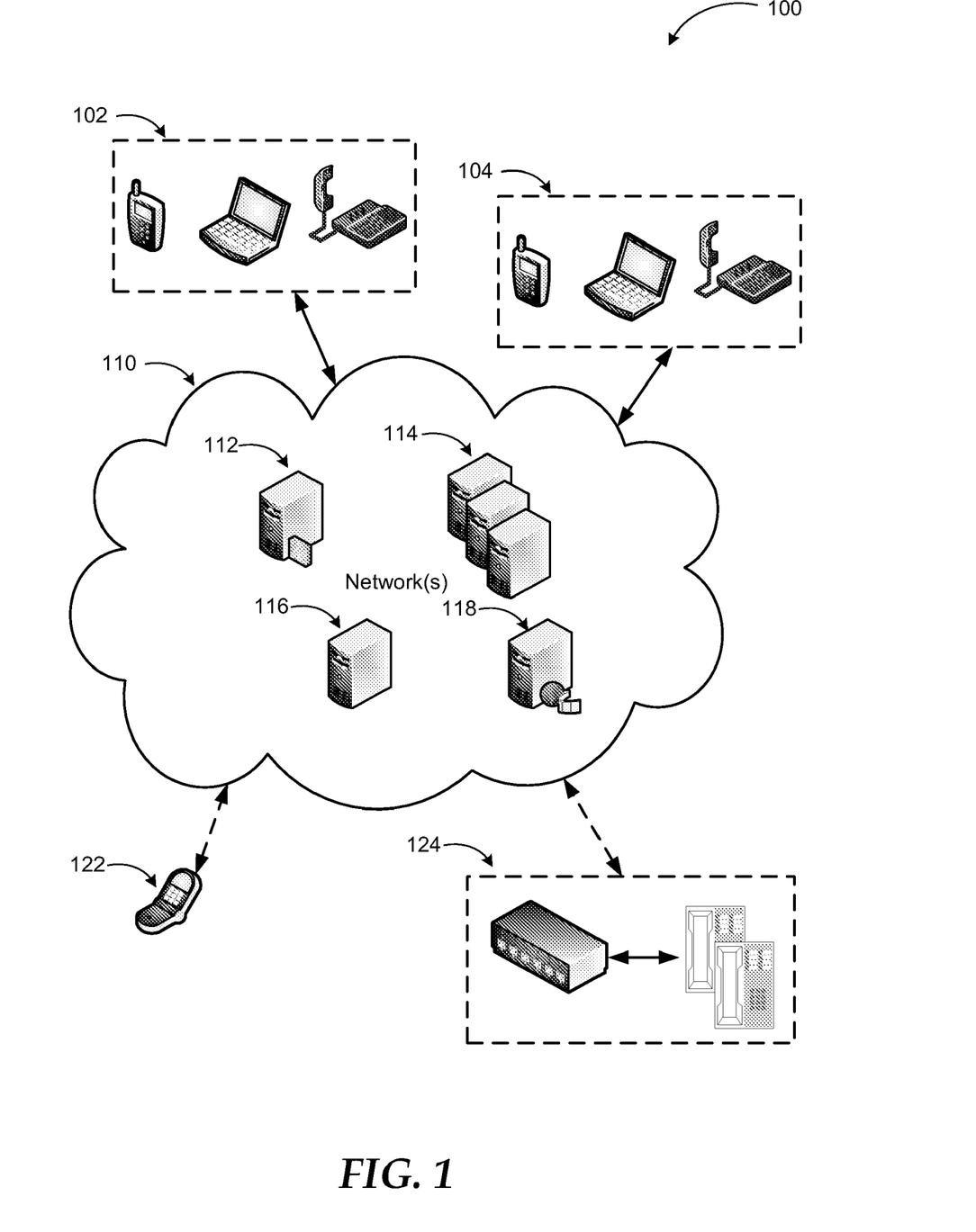
FIG. 1 is a diagram illustrating an example unified communications system.

Referring to FIG. 1, diagram 100 of an example unified communications system is illustrated. As mentioned above, a unified communication system is a real-time communications system facilitating instant messaging, presence, audio-video conferencing, and web conferencing functionality.

In a unified communication system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network (PSTN). End devices may include any type of smart phone, cellular phone, any computing device executing a communication application, a smart automobile console, and advanced phone devices with additional functionality.

Unified Communication (UC) Network(s) 110 includes a number of servers performing different tasks. For example, UC servers 114 provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities as discussed in more detail in FIG. 2 below.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent (e.g. Back-to-Back User Agent "B2BUA").

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

The SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

SIP is intended to provide a signaling and call setup protocol for IP-based communications that can support a superset of the call processing functions and features present in the PSTN. SIP by itself does not define these features, however. Rather, its focus is call-setup and signaling. SIP is also designed to enable the building of such features in network elements known as proxy servers and user agents. These are features that permit familiar telephone-like operations: dialing a number, causing a phone to ring, hearing ring back tones or a busy signal.

SIP-enabled telephony networks can also implement many of the more advanced call processing features. SIP is a client/server protocol that enables peer-to-peer connectivity because each side can function as a client and a server at the same time. As such it requires a relatively simple core network with intelligence distributed to the network edge, embedded in endpoints (end devices built in either hardware or software). SIP features are implemented in the communicating endpoints (i.e. at the edge of the network) as opposed to being implemented in the network.

As discussed below in more detail, organizer(s) and agents deployed in a communication system for end-to-end validation of connectivity and quality may communicate among each other employing SIP. While the example systems are described with SIP features in following figures, many other Voice over IP (VoIP) protocols exist and embodiments may be implemented with any of those protocols using the principles described herein.

Figure 2:
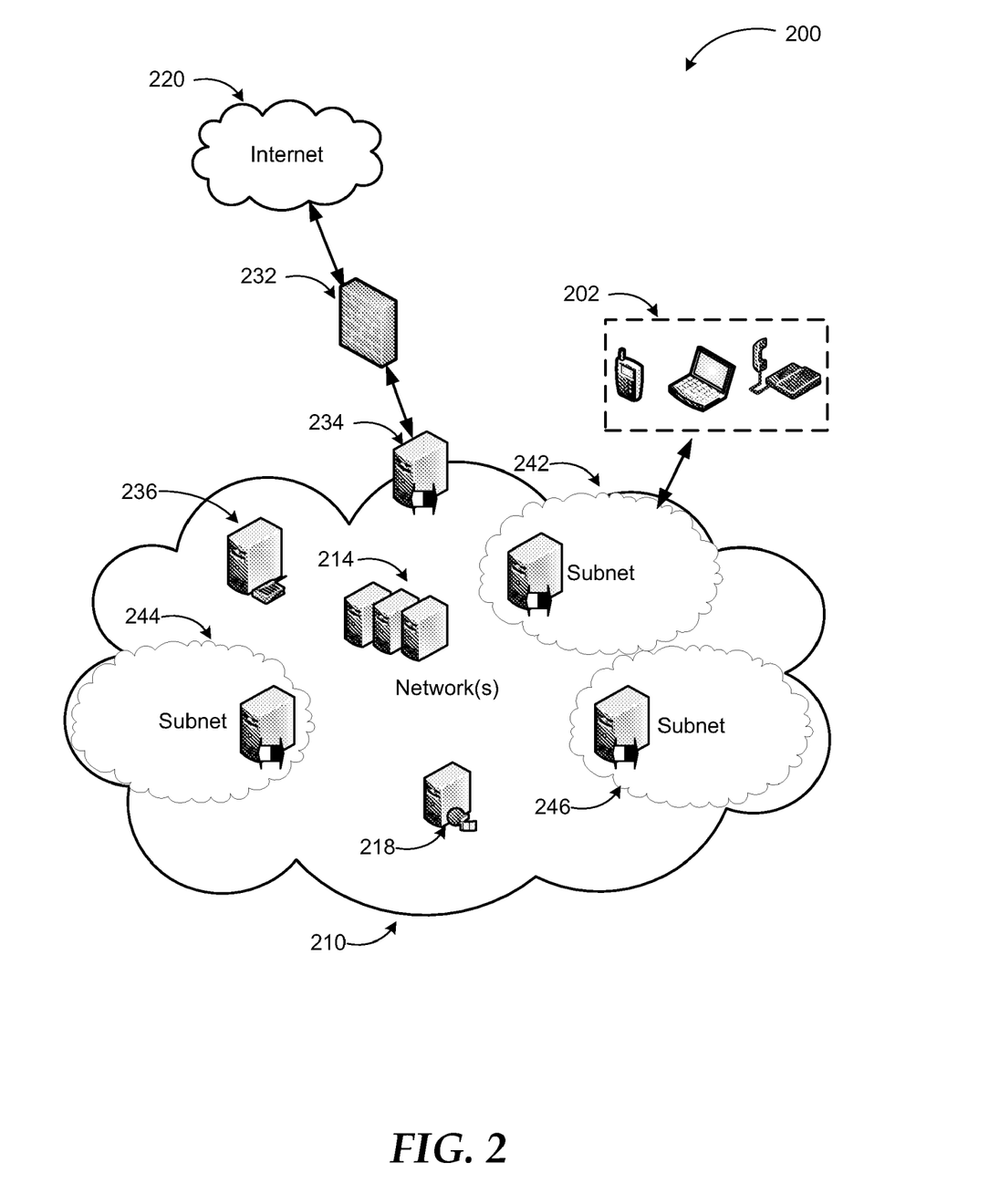
FIG. 2 illustrates another example unified communications system with various subnets and an edge server facilitating communication with other networks.

FIG. 2 illustrates another example unified communications system with various subnets and an edge server facilitating communication with other networks. Network 210 in diagram 200 is a UCN as discussed above. Network 210 may include a number of subnets such as subnets 242, 244, and 246. Network 210 may include one or more of the servers discussed above such as UC servers 214 and facilitate communication for client devices 202.

A/V server 218 is shown as an example server for facilitating conferences between clients of the system as well as callers connecting through other systems. Edge server 234 and firewall 232 are an example of a split access server functionality. Firewall 232 provides protection for connections with other networks such as Internet 220, while edge server 234 provides connectivity through the perimeter network. According to some embodiments, one or more edge servers may provide connectivity to clients connected to network 210 with clients through other networks. According to other embodiments, each subnet within network 210 may be equipped with its own edge server. As mentioned above, one or more of the UC servers 214 may act as home servers to the clients of the system.

In a unified communications system supporting presence functionality, clients login and register/subscribe with a presence server using a SIP registration or subscription mechanism. Such a server is also termed a home server. Home servers are periodically refreshed and the refresh timescales may vary from as small as 5 minutes to as long as 8 hours. Techniques such as using session-timers may be used to detect stale endpoints, but these techniques also fail because of the timescales involved.

With such large refresh timescales, it is crucial that the home server detects an endpoint crash quickly. Otherwise, the home server will continue to report the crashed endpoint as healthy to the subscribers and to the routing module thereby compromising presence and routing fidelity. In addition, stale endpoints may result in wasted resources such as home server memory, operating system handles and locks, database resources, and the like.

For connection-oriented servers, detecting client crashes if the client is directly connected is relatively simple—the loss of the connection indicates a crashed client. In majority of practical situations, however, it is quite usual for the client and the server to be separated by one or more intermediate servers (e.g. edge servers, SIP Proxies, load balancing servers, etc.). Embodiments are directed to addressing crashed client scenarios proactively in such indirect client—home server connections. As discussed below in more detail, the approaches for proactively detecting client crashes include notification of a home server about a client by the first server on the path from the client to its home server through establishing a session state, use of a cookie by the home server to extract client crash information from an error message issued by an edge server or by the home server itself, and using a transaction state instead of the cookie to look up endpoint information upon receiving a communication error about the client.

While the example systems in FIGS. 1 and 2 have been described with specific components such as mediation server, A/V server, and the like, embodiments are not limited to these components or system configurations and can be implemented with other system configuration employing fewer or additional components. Functionality of the systems enabling proactive detection of crashed clients by home servers may also be distributed among the components of the systems differently depending on component capabilities and system configurations.

Figure 3:
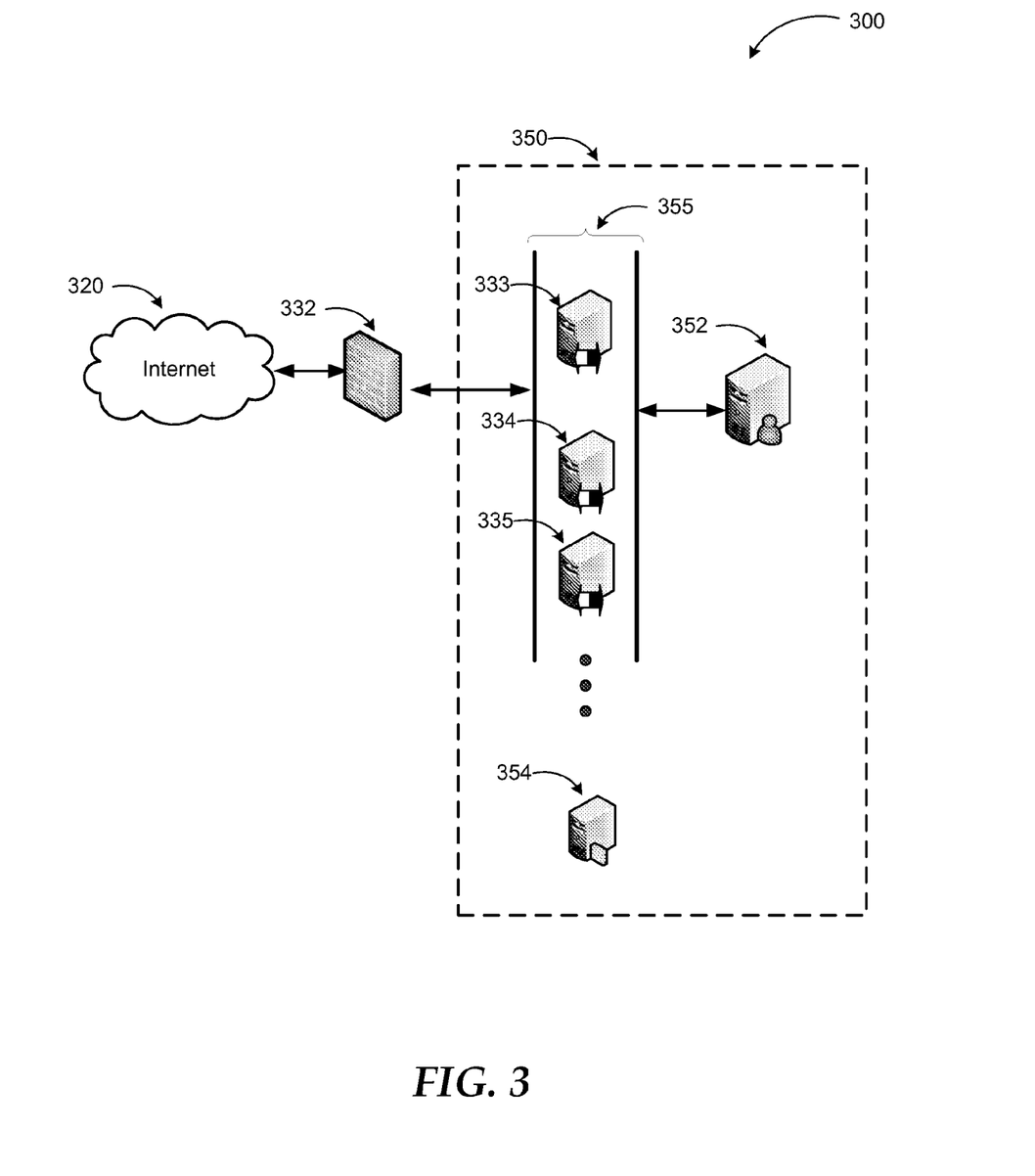
FIG. 3 illustrates an example real time communication system topology with scalable edge servers.

FIG. 3 illustrates an example real time communication system topology with scalable edge servers. Many topologies of unified communication networks utilizing edge servers for connectivity to other networks and clients, and home servers within the UCN may be implemented. Examples include, but are not limited to, consolidated topology, where three different edge server roles (access edge server, conferencing edge server, and A/V edge server) may be collocated on a single physical computer; single site topology, where access edge server and conferencing edge server may be collocated on a single physical computer while A/V edge server is implemented as a separate server; scaled single site topology, where the structure similar to the single site topology is complemented by load balancing servers for each edge server and a reverse proxy server; and multi-site topology supporting multiple sites for organizations with remote sites that are geographically dispersed and are connected through Wide Area Networks (WANs). End devices for each of the components are not shown in this diagram for simplicity.

The example system in diagram 300 is according to a single site scalable topology, where access and conferencing edge server 333 and access edge server 335 reside in perimeter network 355 and provide connectivity through firewall 332 to other networks such as Internet 320. Load balancing edge servers such as server 334 may be deployed for scalability. Real time communication server 352 represents one home server that can be used to provide presence functionality to clients of the system. Thus, the edge servers (333, 335) are in the path between a client and its home server (352). The system may also include a reverse proxy server 354 for enabling access for external and remote users to resources of the system such as conferencing content, address book entries, and so on.

As mentioned above, various approaches may be utilized to detect client crashes proactively. According to one embodiment, the first server (e.g. edge server 333) in the path between the client and the home server may create a session state once a registration dialog is established for that client. The session state may contain information about the client, its connection information, and the home server information. This data may be extracted from the registration response by looking up the appropriate fields from the SIP headers. When the first server detects that the client has crashed, it may construct a special message that is sent to the home server via the same set of intermediate servers. The special message may be a SIP request that is destined for the home server and contain information about the crashed client. Upon receipt of this information, the home server may update its local state such as deregistering the endpoint and notifying all watchers.

According to another embodiment, the home server may add a special cookie containing information about an endpoint, whenever it proxies a request targeted to that client endpoint. The cookie may be inserted into the outgoing "via" header such that the home server can intercept and handle the response before forwarding the response to its final destination. When the client crashes, the first server in the path between the client and the home server may respond with a SIP error response. Upon receipt of this error response, the home server may use the special cookie contained in the outgoing "via" header to extract the endpoint information and invalidate all dialogs associated with that endpoint. The home server may then notify all subscribers that the user is offline. From that point, this endpoint information becomes no longer available to a routing module and hence any call routing is done only to valid endpoints increasing system efficiency.

According to a further embodiment, the home server may maintain a transaction state for each outgoing request, instead of adding the special cookie to the outgoing request's via header. When the home server receives an error response from the first server on the path, it can look up the endpoint information using the transaction state and then perform the record update. A home server according to embodiments may also include registrar, presence, and/or conferencing server roles.

Figure 4:
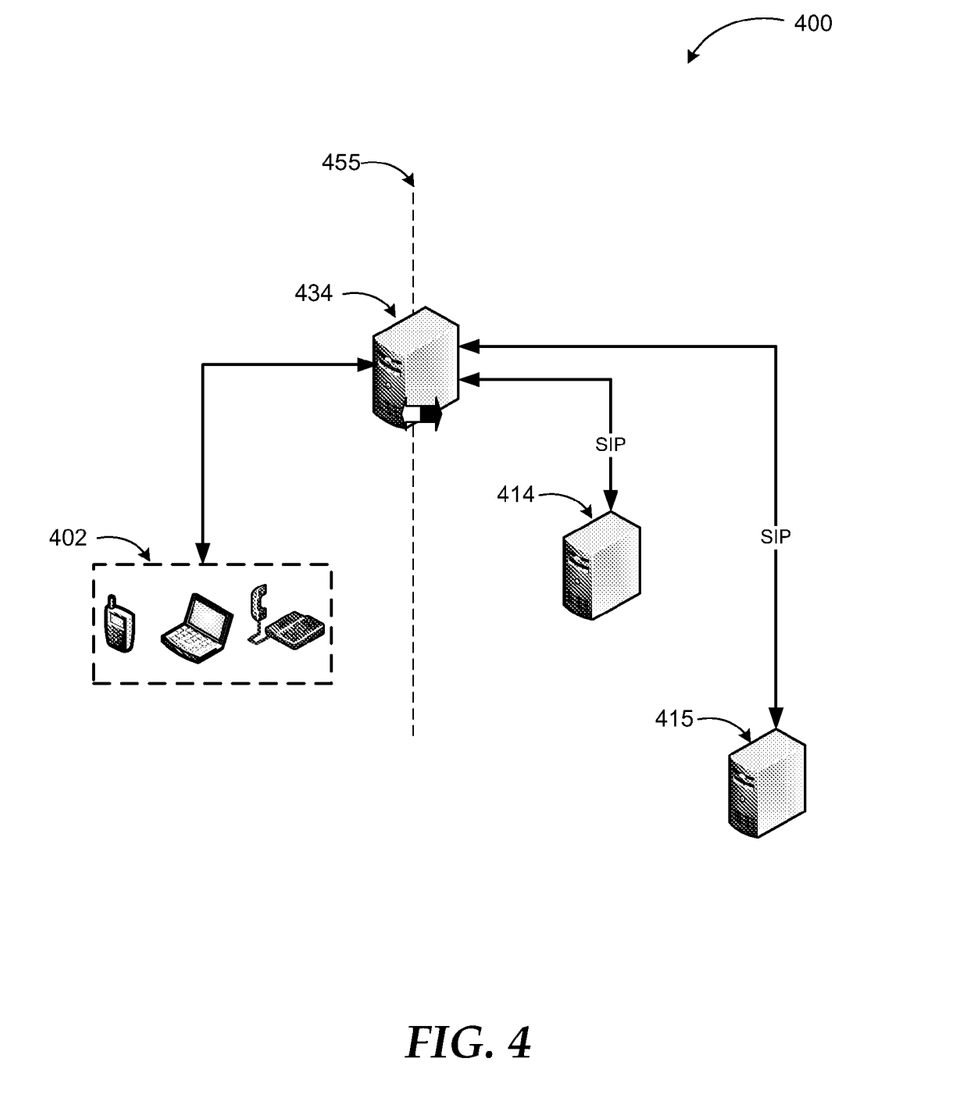
FIG. 4 illustrates example interactions between a client, an edge server and home servers managing the client in a system according to embodiments.

FIG. 4 illustrates example interactions between a client 402, an edge server 434 and home servers 414 and 415 managing the client in a system according to embodiments. As described above, a session state created by a first server (434) containing client and path information, a cookie inserted into the SIP dialog by the home server (414 or 415), and a transaction state maintained by the home server may be utilized to detect client crashes without having to wait for the periodic home server refresh.

In any of these techniques a race condition may occur when the client crashes and recovers fast. In such a scenario, it is possible that the cleanup logic of the home server may invalidate a newer endpoint if messages get re-ordered in the network. In order to prevent this possibility, an "era" may be associated with the lifecycle of each endpoint. The era may be a timestamp or a sequence number maintained by the home server, and may be incremented for each new endpoint registration. The era may be stored by the first server (for the session state approach), in the "via" header (for the cookie approach), or in the transaction state (for the transaction state approach). The endpoint invalidation may then be performed only if the stored era matches the current era. Otherwise, the conclusion is that the endpoint has already been refreshed and no update is necessary.

Unified communication systems according to embodiments also include conferencing capabilities. In a conferencing system there may be multiple entities—a conference server and MCU's to which the client is connected to. In this scenario, the conference server may use any of the above described approaches to detect that the client has crashed and indicate that to other conference participants. Once the conference server detects proactively the client has crashed, it may send a notification to the MCU's asking them to update their state for this endpoint.

The operations and scenarios, as well as components of a unified communication system proactively detecting client crashes, described in FIG. 2-4 are exemplary for illustration purposes. A unified communication system according to embodiments may be implemented using additional or fewer components and other schemes using the principles described herein.

Figure 5:
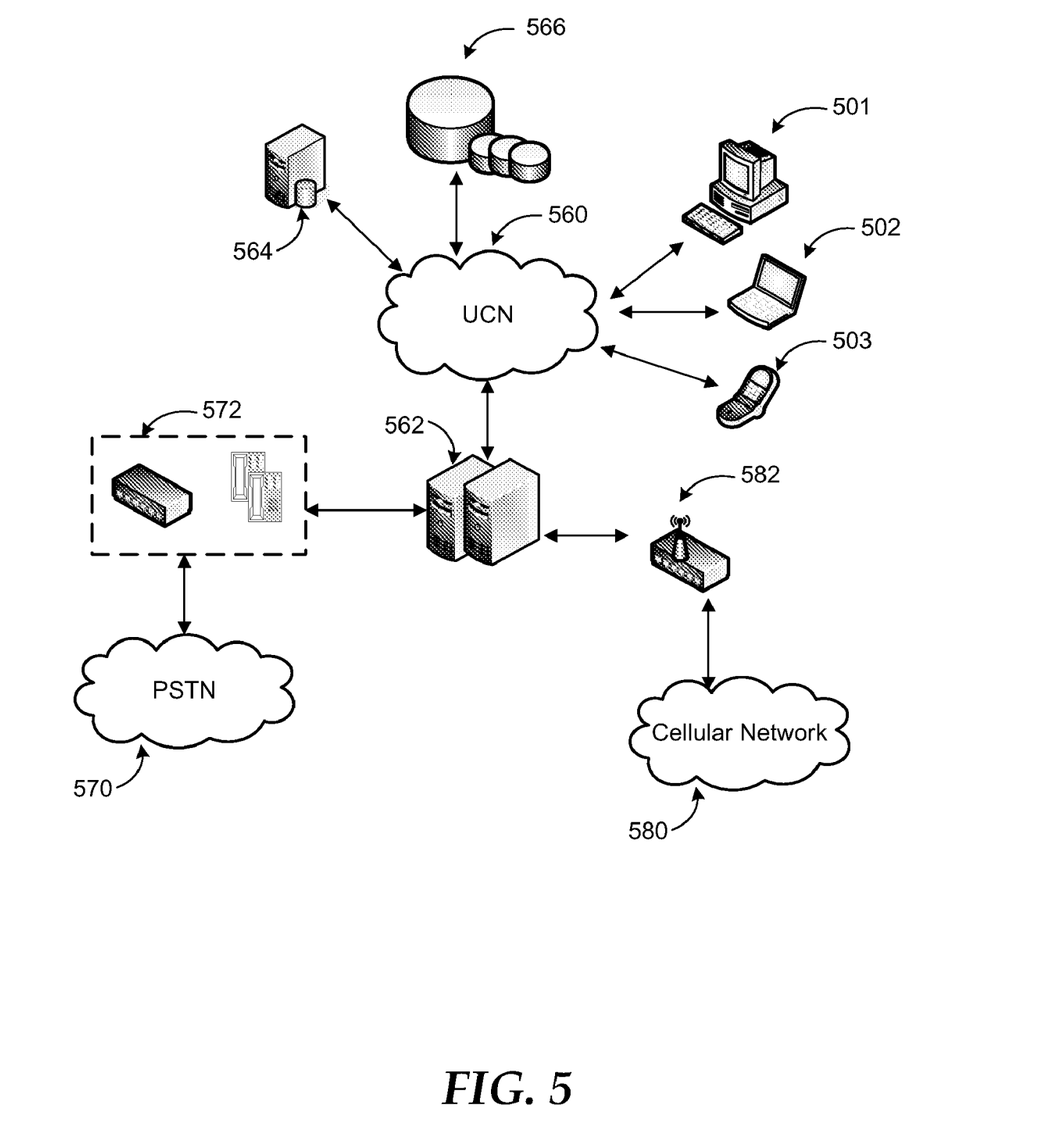
FIG. 5 illustrates a networked environment where embodiments may be implemented.

FIG. 5 is an example networked environment, where embodiments may be implemented. Enhanced presence routing and roster fidelity through proactive endpoint crash detection as described previously may be implemented locally or in a distributed manner over a number of physical and virtual clients and servers. Such a system may typically involve one or more networks such as PSTN 570, cellular network 580, and UCN 560. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. A system according to embodiments may involve many more components, typical and relevant ones are discussed in conjunction with this figure.

Mediation server(s) 562 may provide signaling and media exchange between the different systems. A PBX 572 and an RF modem 582 may be used for connection between the PSTN and the cellular networks, respectively, and the mediation server(s) 562. Client devices 501-503 communicate with each other and with devices on other networks through UCN 560. The UC system may also include a one or more specialized or combination servers (not shown) for presence, routing, and other functionalities.

The paths between clients at various locations on the UCN 560 and their home servers may include additional servers such as edge servers. Upon detecting the crash of a client, the edge server may be used by the home server to obtain the crash information relatively quickly (without waiting for a home server refresh) through the use of session states at the edge servers, transaction states at the home servers, or special cookies in SIP dialogs between clients and home servers. Data associated with the system configuration (e.g. user names, phone numbers, call policies, configuration, records, etc.) and other network related operations may be stored in one or more data stores such as data stores 566, which may be directly accessed by the servers and/or clients of the system or managed through a database server 564. UCN 560 provides the backbone of the UC system and may employ a number of protocols such as SIP, RTP, and the like. Client devices (e.g. 501-503) provide platforms for UCN user end points. Users may access the communication system using a client device or one or more client applications running on a client device.

UCN 560 provides communication between the nodes described herein. By way of example, and not limitation, UCN 560 may include wired media such as a wired network or direct-wired connection, and wireless media such as acoustic, RF, infrared and other wireless media.

Many other configurations of computing devices, applications, data sources, data distribution systems may be employed to implement proactive detection of client crashes. Furthermore, the networked environments discussed in FIG. 5 are for illustration purposes only. Embodiments are not limited to the example applications, modules, or processes.

Figure 6:
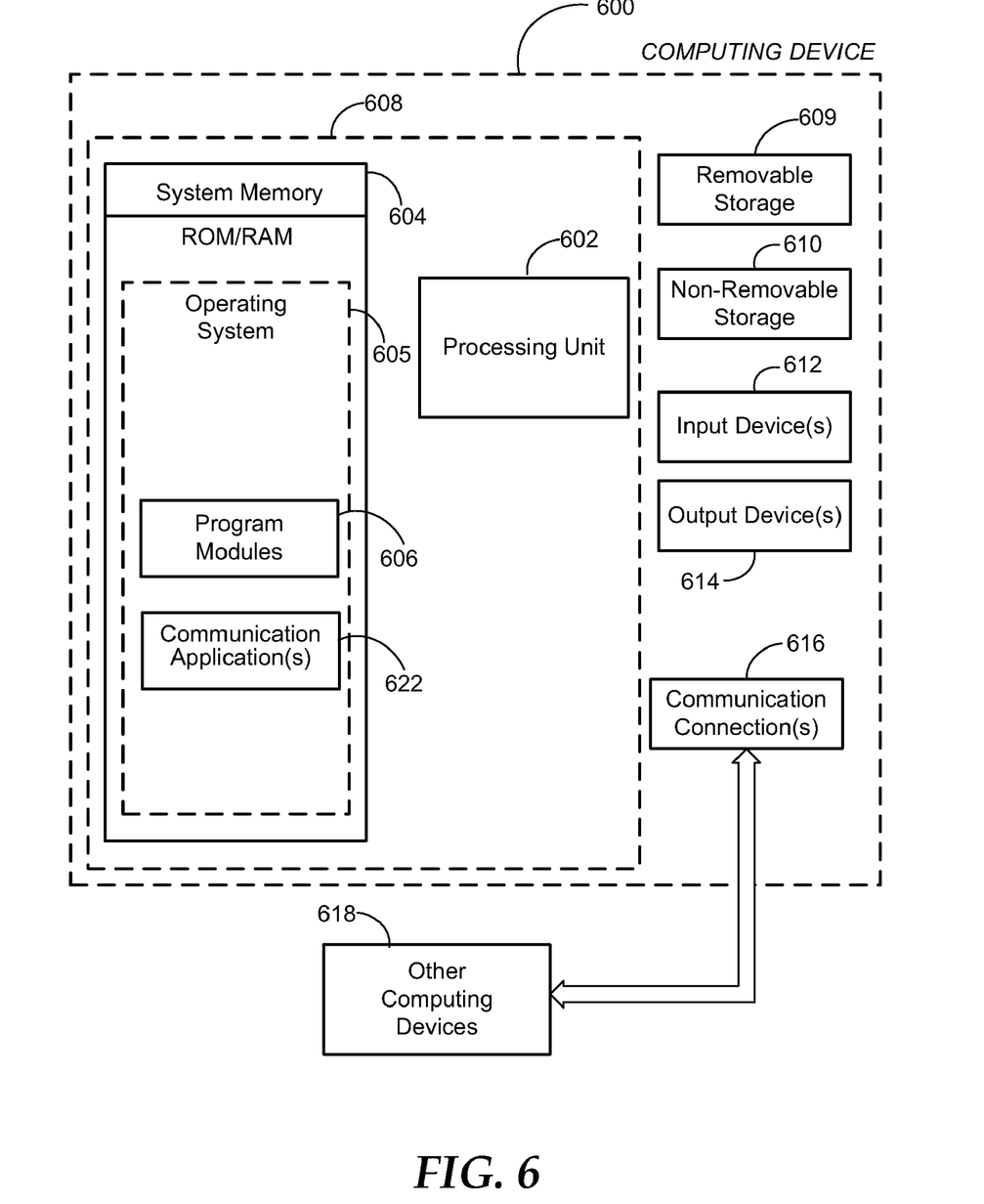
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a home server registering and managing clients in a unified communication system. Computing device 600 may typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the computing device, such as the WINDOWS® operating systems from MICROSOFT CORPORATION of Redmond, Wash. The system memory 604 may also include one or more software applications such as program modules 606, and other communication applications 622.

Communication applications 622 may be separate applications or integral modules of a hosted service application that provide advanced communication services through computing device 600 such as registration, presence management, client crash detection, and communication facilitation to the clients of the UC system—including end devices and client applications running on end devices—, as described previously. This basic configuration is illustrated in FIG. 6 by those components within dashed line 608.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and non-volatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include client devices and servers of a UC network as discussed above. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
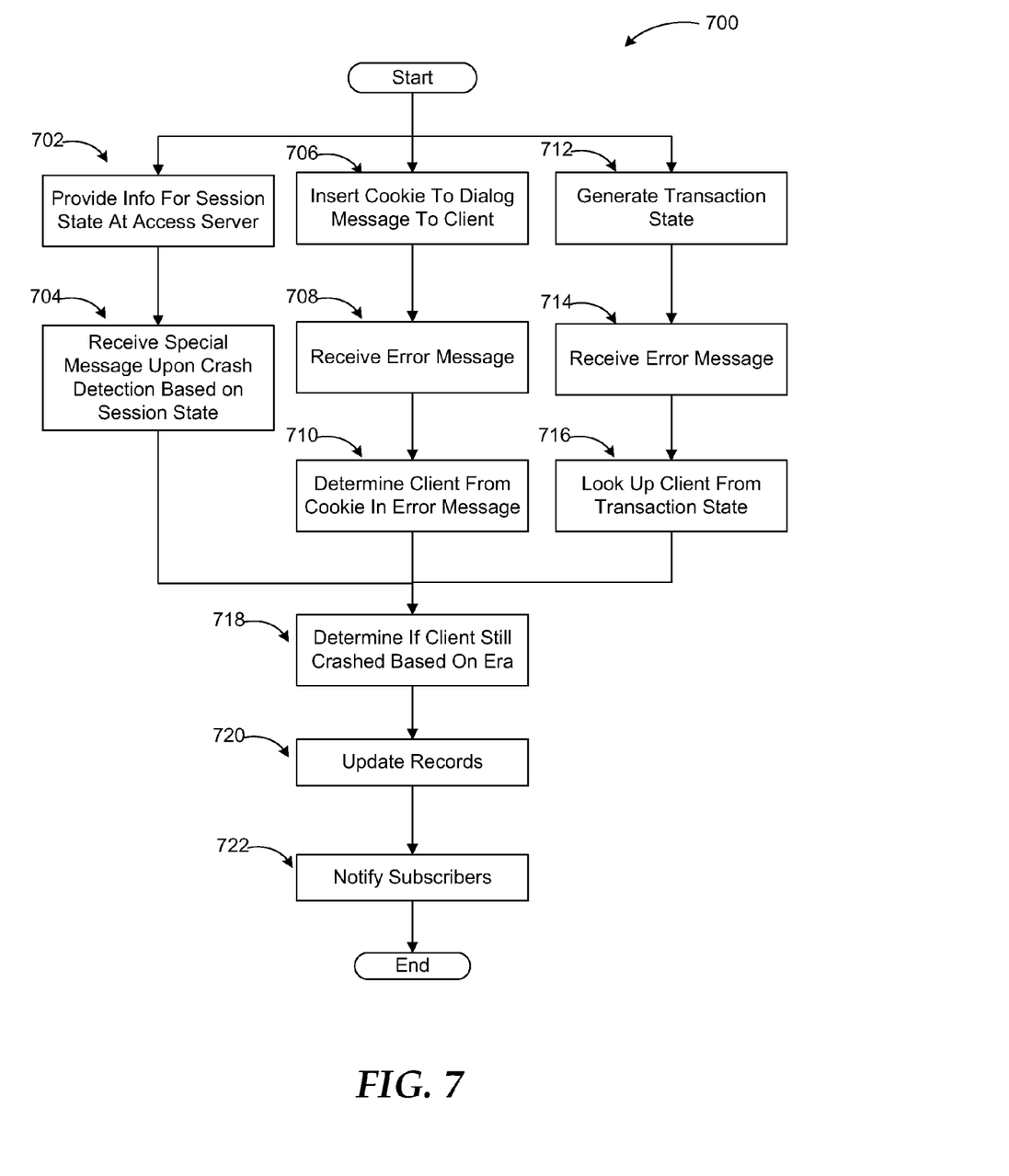
FIG. 7 illustrates a logic flow diagram for a process of routing a communication request in a real time communication system according to embodiments.

FIG. 7 illustrates a logic flow diagram for process 700 of routing a communication request in a real time communication system according to embodiments. Process 700 may be implemented in a home server as discussed previously.

Process 700 begins with three alternative operations 702, 706 and 712. Each of these operations may be used by the home server exclusively or in combination with one or both of the others. At operation 702, information about the home server, the client (endpoint), and the path between the two is provided to a first server on the path such as a session state can be created at the first server. Processing moves to operation 704, where a special message is received from the first server upon detection of client crash, the message including information from the session state.

At alternative operation 706, a cookie is inserted into a dialog message with the client identifying the client. At following operation 708, an error message is received from the first server on the path upon detection of client crash by that server. The identity of the crashed client can be determined at subsequent operation 710 based on the cookie in the error message. At alternative operation 712, a transaction state is created at the home server associated with the client and the path to the client. Upon receipt of an error message from the first server on the path indicating the client has crashed at operation 714, the home server can look up the client from the transaction state at subsequent operation 716.

Processing advances from alternate operations 704, 710, and 716 to operation 718, where a determination is made whether the client is still in crashed state. This determination may be made using a timestamp or a sequence number ("era") maintained by the home server and increment upon each new registration of the client. If the current era and the stored one match, the client is crashed. Otherwise, the client has recovered and no update may be necessary.

At following operation 720, the home server may update its records to reflect that the client of interest is unavailable. At next operation 722, subscribers to the client and any routing services may be notified such that calls to the crashed client are not placed increasing a routing and presence fidelity of the system. In a conferencing system, the notification may be made by a conference server to MCUs such that the crashed client is taken out of the conference.

The operations included in process 700 are for illustration purposes. Enhanced presence, routing, and roster fidelity through proactive client crash detection may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for proactively detecting endpoint crashes in a unified communication network (UCN), the method comprising:

detecting an endpoint crash at a first server on a communication path between the endpoint and an associated home server configured to manage the endpoint;

receiving a message associated with the endpoint crash at the home server;

determining an identity of the crashed endpoint through at least one from a set of: maintaining a session state at the first server, inserting a cookie to dialog messages with the endpoint, and maintaining a transaction state at the home server;

updating home server records based on crashed status of the endpoint;

notifying subscribers of a client at the endpoint about the crashed status of the endpoint; and creating an era at the home server for each endpoint, wherein the era is one of a time stamp and a sequence number.

2. The method of claim 1, wherein determining the identity of the crashed endpoint through maintaining a session state at the first server includes:

creating the session state upon establishment of a registration dialog between the endpoint and the home server, wherein the session state includes information associated with the endpoint, the home server, and the communication path between the endpoint and the home server; and upon detecting the endpoint crash, constructing a special message to the home server via the communication path defined in the session state, wherein the special message includes information associated with the endpoint.

3. The method of claim 2, wherein the information included in the session state is extracted from a registration response of the home server, and wherein the special message is a Session Initiation Protocol (SIP) request.

4. The method of claim 1, wherein determining the identity of the crashed endpoint through inserting a cookie to dialog messages with the endpoint includes:

inserting the cookie containing information associated with the identity of the endpoint to each message from the home server to the endpoint;

upon detecting the endpoint crash, returning a standardized error message to the home server; and determining from the cookie the identity of the endpoint associated with the error message.

5. The method of claim 1, wherein determining the identity of the crashed endpoint through maintaining a transaction state at the home server includes:

creating a transaction state for each outgoing request to the endpoint at the home server; and upon receiving an error message from the first server, looking up endpoint information in the corresponding transaction state.

6. The method of claim 1, further comprising:
   storing the era in one of: the session state, the cookie, and the transaction state;
   incrementing the era for each new endpoint registration;
   upon determining the identity of the crashed endpoint, comparing the stored era with a current era at the home server; and
   updating the home server records only if the stored era and the current era match.

7. The method of claim 1, wherein UCN includes conferencing capability, wherein the identity of the crashed endpoint is determined at a conferencing server, and wherein the conferencing server is configured to notify associated Multipoint Conferencing Units (MCUs) to update their records reflecting the crashed status of the endpoint.

8. The method of claim 1, wherein the first server is an access server and the endpoint is an end device capable of executing a communication application.

9. A system for proactively detecting client crashes in a unified communication network (UCN), the system comprising:
   a plurality of clients configured to provide multi-modal communication services to users through the UCN;
   an access server coupled to at least one client as first server, the access server configured to:
   create a session state associated with a client upon establishment of a registration dialog between the client and its home server, the session state including information associated with the client, its home server, and a communication path between the client and its home server;
   detect a crash of the client;
   transmit a SIP request to the client's home server about the crash, wherein the SIP request includes client information; and
   the home server for registering the client and managing presence operations associated with the client, the home server configured to:
   transmit a registration response upon establishment of each registration dialog such that the access server is enabled to create the session state;
   in response to receiving the SIP request, determine an identity of the crashed client;
   update home server state for the crashed client;
   notify subscribers to the client's presence and any routing servers about the crashed client;
   create and maintain a time stamp that is incremented for each registration of the client with the home server and also stored at the access server; and
   determine whether the client has recovered from the crash prior to updating the home server's records based on a comparison of the time stamps stored at the access server and at the home server.

10. The system of claim 9, wherein the home server is further configured to:
    insert a cookie identifying the client to each outgoing SIP message to the client; and
    determine the identity of the crashed client upon receiving a standardized SIP error message from the access server in response to one of the outgoing SIP messages to the client.

11. The system of claim 10, wherein the cookie is inserted into the "via" header of the outgoing SIP messages.

12. The system of claim 9, wherein the home server is further configured to:
    create a transaction state for each outgoing SIP request to the client; and
    determine the identity of the crashed client upon receiving an error message from the access server by looking up client information in the corresponding transaction state.

13. The system of claim 9, further comprising:
    a conferencing server for facilitating real time conferences between clients;
    a reverse proxy server for providing access to network resources for external and remote users; and
    at least one load balancing server for balancing load on at least one of: the access server, the home server, and the conferencing server.

14. The system of claim 13, wherein the conferencing server is configured to:
    perform crashed client identification tasks of the home server for clients participating in a conference; and
    notify at least one MCU to update its records with the crashed client status such that calls are not routed to the crashed client.

15. The system of claim 13, wherein the conferencing server and the access server are combined as a single computing device.

16. A computer-readable storage medium with instructions stored thereon for proactively detecting client crashes in a unified communication network (UCN), the instructions comprising:
    in response to receiving a message associated with a client crash from a first server on a communication path between the client and a home server, determining an identity of the crashed client through at least one from a set of:
    maintaining a session state at the first server based on information from a registration dialog between the client and the home server, and including in the message information associated with the client based on the session state;
    maintaining at the home server a transaction state associated with each dialog request transmitted to the client, and looking up the client information in the transaction state in response to receiving the message; and
    inserting a cookie in each dialog request transmitted to the client identifying the client, and detecting the cookie in the received message;
    determining whether the client has recovered from the crash based on a comparison of one of a time stamp and a sequence number that is maintained at the home server by incrementing for each registration of the client with the home server and also stored at the access server; and
    if the client has not recovered from the crash, updating home server records associated with the client such that calls are not routed to the crashed client anymore.

17. The computer-readable storage medium of claim 16, wherein the home server is configured to provide presence registration and conference registration services to the client.

18. The computer-readable storage medium of claim 16, wherein the instructions further comprise:
    notifying at least one of: subscribers of the client's presence and a routing server within the UCN for routing calls to the client.

* * * * *